March 16, 1965 R. V. PASS 3,173,324

FACSIMILE RECORDER PAPER CUT OFF MECHANISM

Filed May 31, 1962 3 Sheets-Sheet 1

INVENTOR.
RAYMOND V. PASS

BY Edward V. Connors
Attorney

March 16, 1965 R. V. PASS 3,173,324

FACSIMILE RECORDER PAPER CUT OFF MECHANISM

Filed May 31, 1962 3 Sheets-Sheet 2

INVENTOR
RAYMOND V. PASS
BY Edward V. Connors
Attorney

March 16, 1965 R. V. PASS 3,173,324

FACSIMILE RECORDER PAPER CUT OFF MECHANISM

Filed May 31, 1962 3 Sheets-Sheet 3

INVENTOR
RAYMOND V. PASS
BY Edward V. Connors
Attorney

United States Patent Office 3,173,324
Patented Mar. 16, 1965

3,173,324
FACSIMILE RECORDER PAPER CUT OFF MECHANISM

Raymond V. Pass, Wayne, N.J., assignor to Hogan Faximile Corporation, New York, N.Y.
Filed May 31, 1962, Ser. No. 199,188
1 Claim. (Cl. 83—488)

The present invention relates to electrical facsimile systems and more particularly to a facsimile recorder including cut off mechanism for recorded copy.

Electrical facsimile communication is the art in which graphic material such as pictures, drawings, printed or typed material, or the like, is scanned and the information converted into electric facsimile signals which are used either locally or remotely to produce a "facsimile" of the original or "subject copy."

In a typical facsimile transmitter subject copy is continuously moved past a scanning area where it is illuminated and its reflected image is focussed on a so-called "scanner" by a lens system. The output of the scanner is an electric signal which is transmitted by wire or radio links to the "receiver."

In a typical facsimile receiver, "recorder" means are provided in which a recording medium, such as electrolytic recording paper, is dispensed from a supply roll or "web." The recording paper is marked while it is continuously moved between a pair of electrodes. Marking of the recording paper to produce the facsimile is by the passage of electric current therethrough.

Under operating conditions, the subject copy fed to the transmitter may be of varying lengths with varying intervals between each sheet of subject copy, and the transmitter may be intermittently operated. It is desirable that the recorded facsimile be delivered from the recorder in sheets of the same length as the subject copy. However, because the recording medium is supplied from a web, during the interval between the feeding of each sheet of subject copy, and during the interval between transmissions, there may be a continuous operation of the recorder and thus there is a leader strip ahead of the first recorded facsimile copy and scrap or waste strips between each successive copy. At the end of the transmission the last copy must be separated from the supply web. Further difficulties are presented in the handling of the electrolytic recording paper in that it must be marked while in the moist condition. Although heaters are used to dry the paper after it is marked, it may still be damp and soft as it passes out of the recorder.

Inasmuch as the recorder may be unattended and at a considerable distance from the transmitter, it is essential that the cut off mechanism for separating the facsimile copies and for eliminating the scrap or waste strips must be automatic in operation.

An object of the present invention is to provide a facsimile recorder incorporating a cut off mechanism for recorded copy.

Another object of the present invention is to provide a facsimile recorder cut off mechanism adaptable to remote control of its operation.

Another object of this invention is to provide a facsimile recorder paper cut off mechanism which is simple and economical in manufacture, efficient in operation and rugged in use.

Other objects and advantages of the invention will be apparent from the following description and from the accompanying drawings which show, by way of example, embodiments of the invention.

Figure 1:
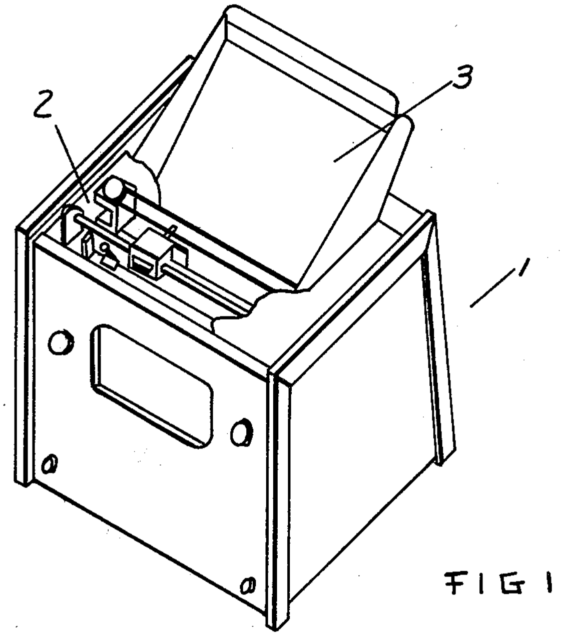
FIGURE 1 is a facsimile recorder incorporating paper cut off mechanism in accordance with the invention.
Figure 2:
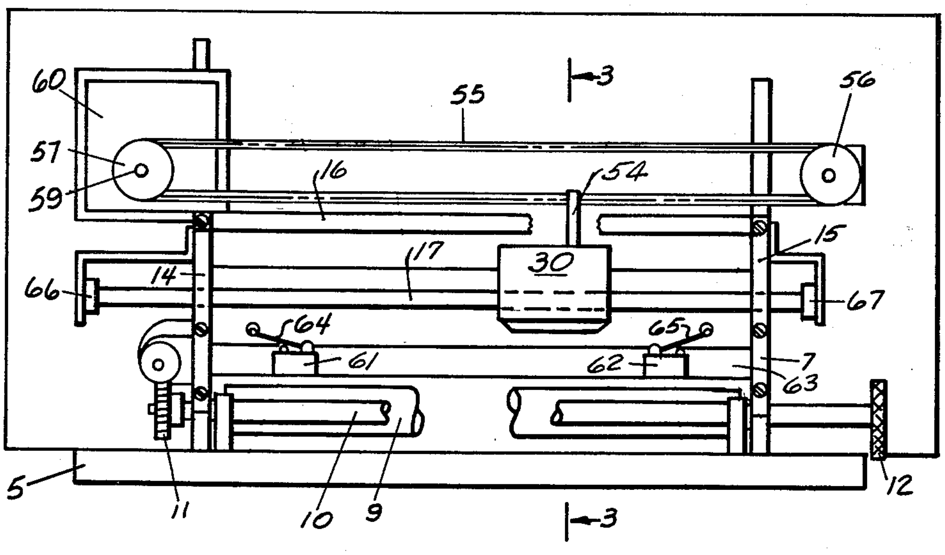
FIGURE 2 is a fragmentary top view showing the paper cut off mechanism.
Figure 3:
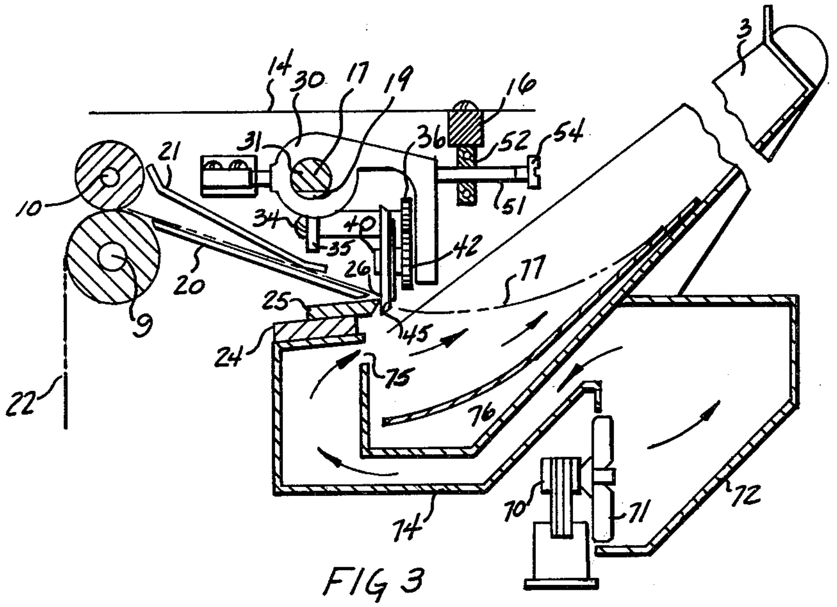
FIGURE 3 is a vertical cross sectional view taken along the line 3—3 of FIGURE 2, and illustrating further mechanism.

Referring to the drawings there is shown in FIGURE 1 a facsimile recorder 1 incorporating a paper cut off mechanism 2 in accordance with the invention. At the top of the recorder 1 is a receptacle 3 adapted to receive cut recorded copy. The recorder paper cut off mechanism 2 is attached to a frame 5 having a pair of side members 6 and 7 adapted to provide journalling means for a pair of feeding paper rollers 9 and 10 positioned in vertical alignment. Suitable driving mechanism 11 is adapted to rotate the rollers, a manual knob 12 being provided acting through an overdrive to advance the paper more rapidly if desired.

Supported by the side members 6 and 7 are a pair of spring members 14 and 15 carrying at their ends a carriage loading guide 16. Also supported by the side frame members 6 and 7 is a rack 17 having a generally circular cross sectional shape and made with rack teeth 19 on the bottom side. A paper guideway 20 extends from the rollers 9 and 10 under the rack 17. A second paper guiding member 21 is positioned over the first paper guideway 20 to confine the direction of travel of recording paper 22. Under the paper guideway 20 is a frame member 24 supporting a fixed linear cutter blade 25 having a cutting edge 26.

Figure 4:
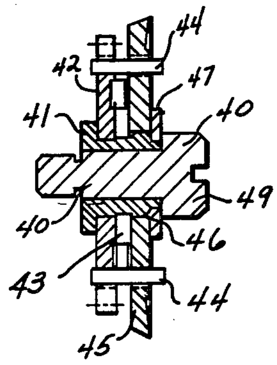
FIGURE 4 is a vertical sectional view taken through the cutter wheel and its driving gear.
Figure 5:
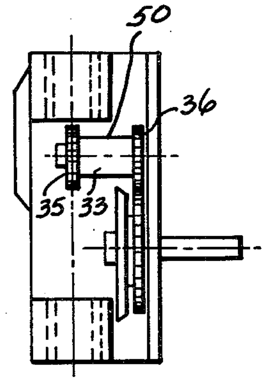
FIGURE 5 is a bottom view of the carriage head.

A carriage 30 is formed with a passage 31 therethrough and provided with bearing means so that the carriage 30 may slide on the rack 17. Inasmuch as the rack 17 is of circular cross-sectional shape it acts as a guiding member for the reciprocal support of the carriage 30. Supported by the carriage 30 is a shoulder screw 34 used as a stationary shaft. Rotatable on the shaft 34 is an idler assembly 33 having at its outer end a gear 35 in engagement with the teeth 19 of the rack 17. At the other end of the idler assembly 33 is a driving gear 36 rotatable with the gear 35. Also carried by the carriage 30 is a shoulder screw 40 also used as a stationary shaft and carrying a bearing 41 on which is fixedly mounted, by means of a press fit, a driven gear 42 having pins 44 extending therefrom and adapted to be received in aligned openings in a cutter wheel 45. A wavy-washer spring 43 is positioned between the gear 42 and the rotary cutter 45 to maintain intimate contact between the cutter wheel 45 and the linear cutting edge 26. As will be seen in FIGURE 4 the bearing member 41 is provided with a surface 46 of rounded cross sectional shape to permit pivotal movement of the cutter wheel 45 with respect to the bearing member 41. A thrust bearing 47 is positioned between screw shaft head 49 and the cutter wheel 45. The pinion gear 35 and the driving gear 36 are carried on bearing 50 by a press fit.

In order to hold the carriage 30 in position so that the cutter wheel 45 bears against the fixed cutter blade 25, and for movement of the carriage along the rack 17, a pulling member 51 is provided extending laterally from the carriage 30. Positioned about the pulling member 51 and fixed in position thereon is a rolling bearing 52 adapted to bear against the underside of the carriage loading guide 16. Thus, by the action of the spring members 14 and 15, the carriage 30 is yieldably maintained in proper operating position.

At the outer end of the pulling member 51 is a fitting 54 adapted to have secured thereto the ends of a chain 55. The carriage is moved along the length of its rack 17 by the chain 55 which is supported and driven by a pair of sprockets 56 and 57. Sprocket 57 is attached to shaft 59 of a reversible motor drive 60.

At the outer ends of a bracket 63 attached to the side members 6 and 7 is a pair of limit switches 61 and 62 having operating arms 64 and 65, the operating arms being adapted to be contacted by the carriage 30 at the ends of its travel on the rack 17. Rubber bushing members 66 and 67 are provided to cushion the carriage member 30 at the end of its travel.

Although heater means are used to remove the moisture from the recording paper 20 before it reaches the rollers 9 and 10 the paper may still be damp when it passes the cutter wheel 45. In order that the paper will not jam up at this position air flow means are provided to move the paper upwardly into the receptacle 3. A motor 70 having a fan blade 71 is positioned before an opening in an air duct 72 through which air passes via a passage 74 and terminating at an outlet 75 positioned underneath the contact point between the cutter wheel 45 and the cutter blade 25. Thus, as cut sheets of paper are passed into the receptacle 3, they are supported by the air flow. A cut off recording 76 is indicated in position at the bottom of the receptacle 3 while another cut off recording 77 is shown first after being cut while it is still supported by the flow of air emanating from the outlet 75.

Figure 6:
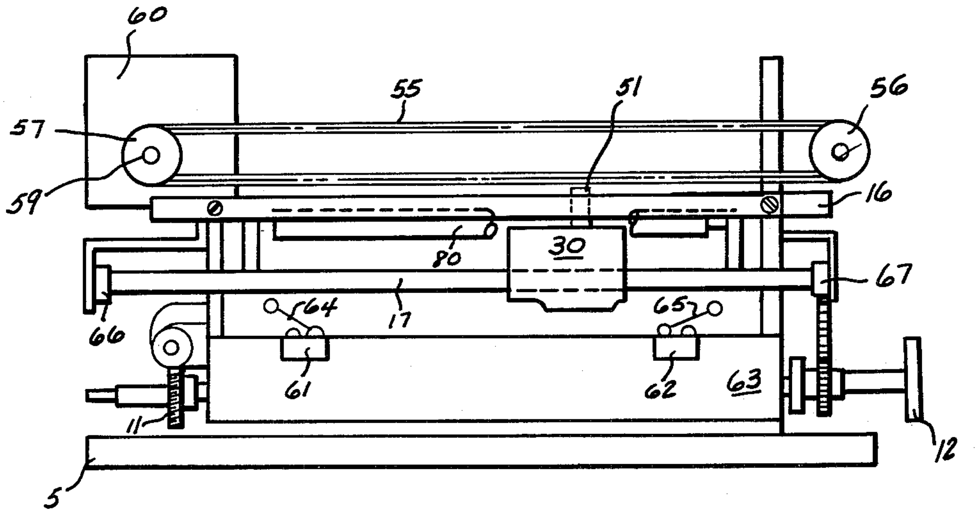
FIGURE 6 is a view corresponding to FIGURE 2 of a modified construction in accordance with the invention.
Figure 7:
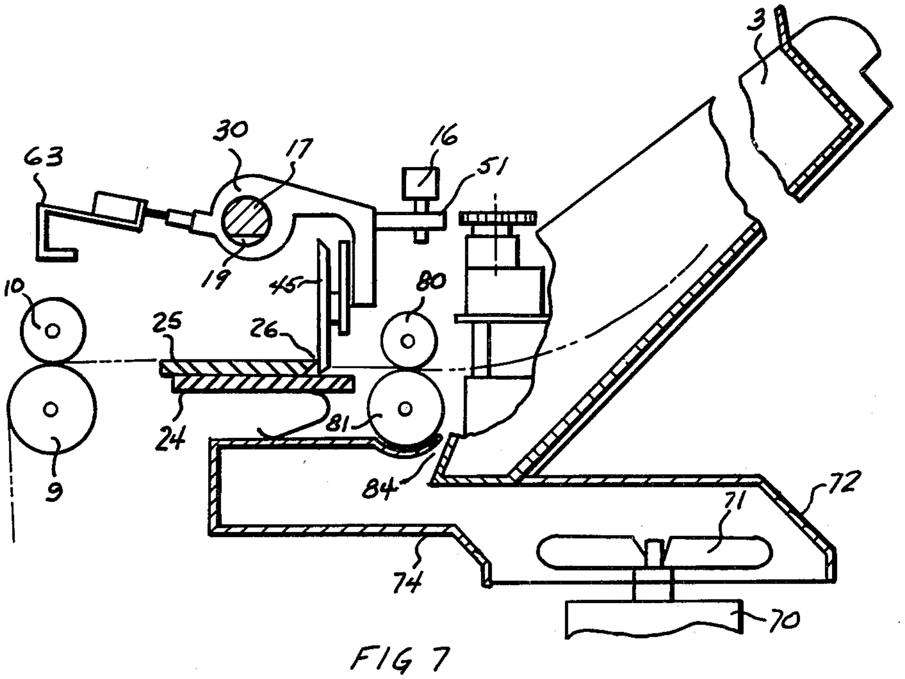
FIGURE 7 is a view corresponding to FIGURE 3 of the modified construction.

Referring to FIGURES 6 and 7 there is shown a somewhat modified construction of the cutter mechanism. In these figures corresponding parts are identified by the same reference numerals as in FIGURES 1 through 5. The construction of FIGURES 6 and 7 incorporates an additional pair of delivery rollers 80 and 81 journalled in the side members 6 and 7. Any suitable form of drive mechanism may be provided for the rollers 9, 10, 80, and 81. However, it is preferred that the peripheral speed of the rollers 80 and 81 be somewhat greater than the peripheral speed of the rollers 9 and 10 in order that the paper 22 may be maintained in a taut position as it passes the cutters 25 and 45.

The rollers 80 and 81 are also used for an additional purpose other than for maintaining the paper 22 in a taut condition in that by providing suitable control mechanism the paper 22 is advanced between the rollers 80 and 81 at the end of an operation of the cut off mechanism. It has been found that in the event the recorder is not used for some time the moist poper may dry out and form a curved edge which may result in a jam up of the recorded copy. However, by advancing the paper between the rollers 80 and 81 before shutting down the recorder there is assurance that upon a later starting operation the paper will be pulled past the cutting surfaces and fed into the receptacle 3. In order to make provision for the space required by the rollers 80 and 81, the housing for the air support means has been changed somewhat and its outlet 84 is positioned under and somewhat to the right of the roller 80 as shown in FIGURE 7.

In the operation of the fascimile recorder paper cut off mechanism in accordance with the invention, at the start of an operation it will be assumed that the paper 22 is threaded between the rollers 9 and 10 over the guideway 20 past the cutting edge 26 of the linear cutter 25 and into the lower portion of the receptacle 3. A recording has been started and the paper 22 is moved over the cutter edge 26. An appropriate signal is then given by control mechanism known in the art which starts the operation of the reversible motor 60. The carriage 30 is quickly moved by its pulling member 51 and along the rack 17 transversely across the paper. As the carriage 30 is moved the pinion 35 engages the teeth 19 of the rack 17 and through the gears 36 and 42 the cutter wheel 45 is rotated at a rate of speed somewhat greater than its rate of linear travel along the cutting edge 26. It has been found that a ratio of peripheral speed of the order of 1.06 to 1 between the pitch diameter of the gear and cutting point provides a satisfactory cutting operation when used with electrolytic recording paper. It has been found that a greater ratio results in excessive wear of the cutter edges.

As the carriage 30 reaches the end of its travel on the rack 17 it contacts one of the operating arms 64 or 65 of the limit switches 61 or 62 thereby disconnecting the operation of the reversible motor 60. The paper 22 is continued in movement while the recording is being made and as the end of the recorded copy reaches the cutting edge 46 the control mechanism causes another operation of the carriage 30 in the opposite direction. As the paper 22 has been fed past the cutting edge 26 the flow of air has contacted its under surface and urged it upwardly in the tray so as to prevent the jamming thereof. The paper gradually settles to the bottom of the tray ready to receive another sheet of recorded copy. In the construction shown in FIGURES 6 and 7 the rollers 81 and 82 feed the paper into the receptacle 3, the air flow emanating from the outlet 84 causing the recorded copy to move upward into the receptacle 3 as in the case of the previously described construction.

While the invention has been described and illustrated with reference to specific embodiments thereof it will be understood that other embodiments may be resorted to without departing from the invention. Therefore, the form of the invention set out above should be considered as illustrative and not as limiting the scope of the following claim.

I claim:

A facsimile recorder paper cut off mechanism comprising a frame, a pair of feeding paper rollers carried by the frame, a rack of generally circular cross section with rack teeth on its bottom side extending parallel to the axis of the feed rollers and at one side thereof, a paper guideway extending downwardly from the feed rollers under the rack, a fixed cutter blade positioned under the rack, a carriage loading guide extending parallel to the rack and spaced at one side therefrom, a carriage including a generally horizontally extending top portion extending along the length of the rack, a downwardly depending side portion at the edge of the top portion of the carriage, a downwardly depending guideway at the other edge of the top portion, bearing means for the guideway slideable on said circular rack, a pair of shaft bearing studs extending from the downwardly depending side portion, a pinion carried by one shaft in engagement with the rack, a driving gear on said one shaft fixed for rotation with the pinion, a rotatable cutter wheel on the other of said shafts, a driven gear on said other shaft in engagement with the driving gear, a pair of diametrically positioned pins extending from the driven gear, the cutter wheel having openings receiving said pins, a spring positioned between the driven gear and the cutter wheel yieldingly urging the cutter wheel away from the driven gear towards the fixed cutter blade, the cutter wheel positioned with its edge at one side of the guideway with its top edge above the lower edge of the rack, a pulling member extending from the downwardly depending side portion of the carriage, and a rotatable bearing member carried by the pulling member, and engaging the under side of the carriage loading guide, whereby the carriage is swung into position with its cutter wheel against the fixed cutter blade.

(References on following page)

References Cited by the Examiner

UNITED STATES PATENTS

| | | | |
|---|---|---|---|
| 208,754 | 10/78 | Morgan | 83—156 |
| 465,428 | 12/91 | Cox | 83—110 |
| 878,527 | 2/08 | Heil | 83—488 |
| 1,025,741 | 5/12 | Fachs | 83—156 |
| 1,651,096 | 11/27 | Molius | 83—98 |
| 2,151,136 | 3/39 | Moffitt | 83—98 |
| 2,219,682 | 10/40 | Doble | 83—98 |
| 2,746,545 | 5/56 | Chamberlain | 83—498 |
| 2,777,521 | 1/57 | Tanis | 83—488 |
| 2,846,005 | 8/58 | Wilson | 83—488 |

FOREIGN PATENTS

| | | |
|---|---|---|
| 34,042 | 1/12 | Sweden. |

ANDREW R. JUHASZ, *Primary Examiner.*

HUNTER C. BOURNE, JR., WILLIAM W. DYER, JR., *Examiners.*